(12) United States Patent
Jung (10) Patent No.: US 12,480,775 B2
(45) Date of Patent: Nov. 25, 2025

(54) VEHICLE CONTROL DEVICE AND VEHICLE SERVICE PROVISION SYSTEM

(71) Applicant: HYUNDAI MOBIS CO., LTD., Seoul (KR)

(72) Inventor: Soo Kyung Jung, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 222 days.

(21) Appl. No.: 18/351,530

(22) Filed: Jul. 13, 2023

(65) Prior Publication Data

US 2024/0183679 A1 Jun. 6, 2024

(30) Foreign Application Priority Data

Dec. 6, 2022 (KR) .................. 10-2022-0168672

(51) Int. Cl.
| | |
|---|---|
| *G01C 21/36* | (2006.01) |
| *B60K 35/21* | (2024.01) |
| *B60K 35/22* | (2024.01) |
| *G06Q 30/06* | (2023.01) |
| *G07C 5/00* | (2006.01) |
| *H04L 67/125* | (2022.01) |

(52) U.S. Cl.
CPC .......... *G01C 21/3611* (2013.01); *G07C 5/008* (2013.01)

(58) Field of Classification Search
CPC ........... G01C 21/3611; G07C 5/008; B60K 2360/168; B60K 2360/175; B60K 2360/573; B60K 2360/589; B60K 35/21; B60K 35/22; B60K 35/26; B60R 16/037; G06Q 30/06; G06Q 50/10; H04L 67/125; H04W 4/44; B60W 10/30; B60W 50/08
See application file for complete search history.

(56) References Cited

U.S. PATENT DOCUMENTS

| | | | | |
|---|---|---|---|---|
| 11,199,853 | B1* | 12/2021 | Afrouzi | B25J 13/006 |
| 2020/0334628 | A1* | 10/2020 | Goldberg | G06Q 30/0633 |
| 2021/0256558 | A1* | 8/2021 | Narasimhan | G06Q 30/0265 |
| 2022/0028192 | A1* | 1/2022 | O'Rourke | G07C 9/00182 |

FOREIGN PATENT DOCUMENTS

| | | |
|---|---|---|
| JP | 2021-146891 A | 9/2021 |
| KR | 10-2021-0116805 A | 9/2021 |
| KR | 10-2022-0035613 A | 3/2022 |
| KR | 10-2022-0036214 A | 3/2022 |

OTHER PUBLICATIONS

Korean Office Action issued Jun. 28, 2024 in corresponding Korean patent application No. 10-2022-0168672.

\* cited by examiner

*Primary Examiner* — Tyler D Paige
(74) *Attorney, Agent, or Firm* — NovoTechIP International PLLC (57) ABSTRACT

A vehicle control device includes: an input unit configured to receive provision order information, such as food and/or beverage order information, from a terminal of a vehicle passenger or a vehicle user interface; a search unit configured to search for at least one vehicle control command matched with the provision order information; and a controller configured to output the vehicle control command for a predetermined time based on a provision reception time according to the provision order information and control an output of a corresponding vehicle component.

19 Claims, 7 Drawing Sheets

VEHICLE CONTROL DEVICE AND VEHICLE SERVICE PROVISION SYSTEM

CROSS-REFERENCE TO RELATED APPLICATIONS

This application claims priority to and the benefit of Korean Patent Application No. 10-2022-0168672, filed on Dec. 6, 2022, the disclosure of which is incorporated herein by reference in its entirety.

TECHNICAL FIELD

Embodiments relate to a vehicle control device and a vehicle service provision system, and more particularly, to a vehicle control device and a vehicle service provision system applicable to a food and beverage delivery service using a vehicle.

BACKGROUND

The future vehicle is a concept of vehicles and a vehicle industry encompassing three areas: eco-friendly vehicles represented by electric and hydrogen vehicles; autonomous vehicles driven based on information and communication technology (ICT) and artificial intelligence (AI); and vehicles sharing services based on smartphones and online-to-offline (O2O) platforms represented by transportation as a service (TaaS). With the advent of the Fourth Industrial Revolution that maximizes automation and connectivity by fusing ICT and AI, the paradigm of the vehicle industry is rapidly shifting from internal combustion engines (personal driving) to electric power (autonomous driving). Since global vehicle consumers are moving to millennials who make much of environmental friendliness, convenience, and safety and the leading countries tighten regulations on environment, fuel efficiency, and safety, companies have developed eco-friendly electric vehicles, while improving the efficiency of internal combustion engines.

Meanwhile, with the advancement of software equipped with semiconductor technology and artificial intelligence technology and the expansion of communication infrastructure such as 5G, a new type of vehicle has emerged according to a change of frame that considers a vehicle not as a mere means of transportation but as a living space with mobility.

In this regard, future mobility business may be developed in two main directions. First, there are various service businesses for non-driving passengers. Since travel basically requires time, it is unavoidable to think about what to do in a vehicle. Watching TV, doing some work, or even having some food is possible. Especially, unlike eating at home or in a restaurant, various companies tend to develop services available for eating in a vehicle regarding a process of receiving food or creating an ambient environment for eating food.

SUMMARY

The present disclosure is directed to providing a vehicle control device and a vehicle service provision system capable of ordering and receiving provisions, such as food and/or beverage, online in a vehicle. Although the following description is provided using food and beverage as an example, it is to be understood that the present disclosure applies to other provisions as well which a vehicle occupant might be interested in ordering and using while occupying the vehicle.

In addition, the present disclosure is directed to providing a vehicle control device and a vehicle service provision system capable of controlling various components of a vehicle according to provision order information such as food and beverage information, passenger information, ambient environment information, or the like.

In addition, the present disclosure is directed to providing a vehicle control device and a vehicle service provision system capable of creating an optimal ambient environment for having food and beverage, and other provisions, inside a vehicle.

According to an aspect of the present disclosure, there is provided a vehicle control device including: an input unit configured to receive provision information such as food and beverage order information from a terminal of a vehicle passenger or a vehicle user interface; a search unit configured to search for at least one vehicle control command matched with the food and beverage order information, etc.; and a controller configured to output the vehicle control command for a predetermined time based on a food and beverage and other provision reception time according to the food and beverage, etc. order information and control an output of a corresponding vehicle component.

The search unit may search for the vehicle control command using a matching table stored in a database.

In the matching table, at least one vehicle control command of a vehicle speaker control command, a vehicle display control command, a vehicle interior lighting control command, a vehicle table control command, a vehicle air conditioning device control command, and a vehicle window control command may be matched with the food and beverage order etc. information as input information.

In the matching table, the vehicle control command may be matched according to at least one of food type information and quantity information included in the food and beverage order information.

In the matching table, the vehicle control command may be matched with at least one of passenger privacy information, ambient environment information, and driving information as additional input information.

The search unit may search for the vehicle control command using a learning model stored in the database.

The learning model may be trained to output at least one vehicle control command of a vehicle speaker control command, a vehicle display control command, a vehicle interior lighting control command, a vehicle table control command, a vehicle air conditioning device control command, and a vehicle window control command with the food and beverage order information as input information.

The learning model may be trained with at least one of passenger privacy information, ambient environment information, and driving information as additional input information.

The search unit may access a server of a company providing ordered food and beverage etc. and search for the vehicle control command.

The food and beverage etc. reception time may be provided from the server of the company providing ordered food and beverage to at least one of the terminal of the vehicle passenger and the vehicle user interface.

According to another aspect of the present disclosure, there is provided a vehicle control service provision system including: a vehicle control device including an input unit configured to receive food and beverage order etc. information from a terminal of a vehicle passenger or a vehicle user interface, a communication unit configured to transmit the food and beverage etc. order information, and a controller configured to output a vehicle control command for a predetermined time based on a food and beverage etc. reception time according to the food and beverage order etc. information and control an output of a corresponding vehicle component; and a company server configured to receive the food and beverage etc. order information and transmit the vehicle control command corresponding thereto to the communication unit of the vehicle control device.

The company server may generate the vehicle control command to correspond to at least one of visual information and auditory information provided in a store and transmit the vehicle control command to the communication unit of the vehicle control device.

The company server may generate the food and beverage etc. reception time and provide the food and beverage reception time to at least one of the terminal of the vehicle passenger and the vehicle user interface.

The company server may generate a vehicle control command including at least one of a vehicle speaker control command, a vehicle display control command, a vehicle interior lighting control command, a vehicle table control command, a vehicle air conditioning device control command, and a vehicle window control command matched with input information with the food and beverage etc. order information as the input information, and transmit the vehicle control command to the communication unit.

The communication unit may transmit at least one of passenger privacy information, ambient environment information, and driving information as additional input information to the company server.

The company server may generate the vehicle control command matched with the input information and the additional input information and transmit the vehicle control command to the communication unit.

According to still another aspect of the present disclosure, there is provided a vehicle control service provision system including: a vehicle control device including an input unit configured to receive food and beverage etc. order information from a terminal of a vehicle passenger or a vehicle user interface, a communication unit configured to transmit the food and beverage etc. order information, and a controller configured to output a vehicle control command for a predetermined time based on a food and beverage etc. reception time according to the food and beverage etc. order information and control an output of a corresponding vehicle component; and a learning model server including a learning model trained to output the vehicle control command using the food and beverage etc. order information as input information and configured to generate the vehicle control command using the learning model, when the food and beverage etc. order information is input, and transmit the vehicle control command to the communication unit of the vehicle control device.

The learning model may be trained to output the vehicle control command including at least one of a vehicle speaker control command, a vehicle display control command, a vehicle interior lighting control command, a vehicle table control command, a vehicle air conditioning device control command, and a vehicle window control command with the food and beverage order information as input information.

The learning model may be trained with at least one of passenger privacy information, ambient environment information, and driving information as additional input information.

The learning model server may construct the learning model by receiving training data from a plurality of vehicle control devices.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

The present disclosure may be modified in various ways and have various embodiments, and specific embodiments will be described with reference to the drawings. However, the description is not intended to limit the present disclosure to the specific embodiments, and it should be construed as including all modifications, equivalents, or substitutes in a technical concept and a technical scope of the present disclosure.

Terms including ordinals such as "second," "first," or the like may be used to describe various components, but the components are not limited by the terms. The terms are only used to differentiate one component from other components. For example, a second component may be named as a first component without departing from the right scope of the present disclosure, and similarly, a first component may be named as a second component. The term 'and/or' includes a combination of a plurality of relevant items described herein or any one of a plurality of relevant items described herein.

It should be understood that, when a component is referred to as being "connected to" or "coupled to" another component, it may be directly connected to or coupled to the other component or there may be yet another component therebetween. In contrast, it should be understood that, when a component is referred to as being "directly coupled" or "directly connected" to another component, there is no intervening component therebetween.

The terms used in the present specification are merely used to describe particular embodiments, and are not intended to limit the present disclosure. Singular expressions include plural expressions unless the context clearly indicates otherwise. In the present specification, it is to be understood that terms such as "including", "having", or the like are intended to indicate the existence of the features, numbers, steps, actions, constituent elements, parts, or combinations thereof disclosed in the specification, and are not intended to preclude the possibility that one or more other features, numbers, steps, actions, constituent elements, parts, or combinations thereof may exist or may be added.

Unless otherwise defined, all terms, including technical and scientific terms, used herein have the same meaning as commonly understood by those of ordinary skill in the art to which the present disclosure pertains. Terms defined in commonly used dictionaries should be interpreted as having meanings consistent with their meanings in the context of the related art and should not be interpreted in an idealized or overly formal sense unless expressly so defined herein.

Hereinafter, embodiments will be described in detail with reference to the accompanying drawings, but the same or corresponding components are assigned the same reference numbers even in different drawings and are not redundantly described herein.

Figure 1:
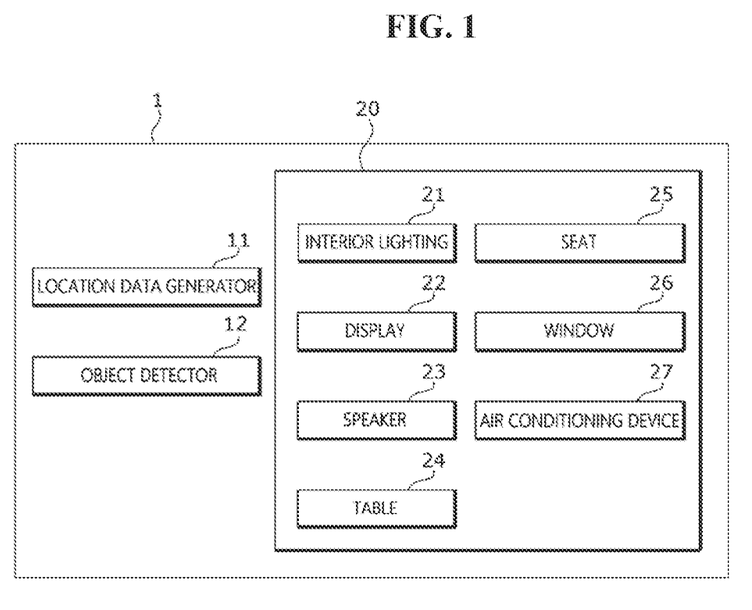
FIG. 1 is a basic conceptual view of a vehicle equipped with a vehicle control device according to an embodiment.

FIG. 1 is a basic conceptual view of a vehicle equipped with a vehicle control device according to an embodiment.

A location data generator 11 of a vehicle 1 may be mounted in the vehicle 1 and detect location information of the vehicle 1. The location data generator 11 may include at least one of a global positioning system (GPS) and a differential global positioning system (DGPS). The location data generator 11 may generate location information of the vehicle 1 based on a signal generated by at least one of the GPS and the DGPS. According to the embodiment, the location data generator 11 may correct location data based on at least one of an inertial measurement unit (IMU) and a camera of an object detector 12. The location data generator 11 may be named a global navigation satellite system (GNSS).

The vehicle 1 may include an internal communication system. A plurality of electronic devices included in the vehicle 1 may exchange signals through the internal communication system. The signals may include data. The internal communication system may use at least one communication protocol (for example, CAN, LIN, FlexRay, MOST, Ethernet, or the like).

In the embodiment, vehicle components 20 may include an interior lighting 21, a display 22, a speaker 23, a table 24, a seat 25, a window 26, an air conditioning device 27, and the like.

The interior lighting 21 may include a room lamp and a mood lamp. The room lamp is a lamp located on a ceiling part of a car interior and intended to illuminate the whole car interior and basically has an on-mode, which is always turned on, an off-mode, which is always turned off, and a door-mode for being turned on when a car door is open. In addition, the mood lamp of the car is a lamp for creating a subtle ambiance in the vehicle interior using soft luminance and various colors during travel and may be mounted at a predetermined position of the car interior.

The display 22 may be mounted on a vehicle interior cockpit module, a rear side of a seat, or the like. The display 22 may include at least one of a liquid crystal display (LCD), a thin film transistor-liquid crystal display (TFT LCD), an organic light-emitting diode (OLED), a flexible display, a 3D display, an e-ink display, and the like.

The display 22 may output specific content on a screen according to control of a controller 150.

In addition, the display 22 may output various user interfaces or graphic user interfaces on the screen.

In addition, the display 22 may be embodied in the form of a head-up display (HUD). The HUD may be a front display device of the vehicle 1 and mean a vehicle electronic equipment technology for enhancing driver's safety and convenience. The HUD enables meter information to be seen at a glance by a method of reflecting graphics data, which shows information necessary for driving the vehicle 1, on a windshield of the vehicle 1 in order to display the information on the windshield. Thus, the HUD may enable the driver to check the meter information or the like without shifting his gaze, thereby serving to secure safety while driving.

The speaker 23 may be installed inside the vehicle 1 in the form of audio, video, and navigation (AVN), perform infotainment functions such as playing multimedia files and the like, and perform navigation functions such as guiding routes and the like. Through AVN, a current location of the vehicle 1 may be detected, and an expected driving route to a target destination may be calculated and displayed. In addition, through AVN, a driver input may be performed.

The vehicle table 24 may be mounted in and extracted from a dashboard layout or mounted in and extracted from a rear side of the back of a vehicle seat, a vehicle door, or the like. The vehicle table 24 may be equipped with a swing mechanism for folding storage and a tilting and rotating mechanism.

The seat 25 may be mounted inside the vehicle 1, maintain the comfortable positions and postures of a driver and a passenger, and help the passenger sit in the vehicle 1 for a long time. The seat 25 is a chair-shaped part fixed on the floor of the vehicle and is composed of a head rest supporting a head on an upper end portion of the seat, a seat back, and a seat cushion, and more specifically, frames constituting the seat include a back frame, a recliner, a bottom frame, a slice rail, and the like. The controller 150 may adjust inclinations of each of the head rest, the seat back, and the like by controlling an actuator disposed inside the seat 25.

The vehicle window 26 may include a window between vehicle side pillars including a front windshield, and a degree of opening and closing may be adjusted by control. In addition, the window 26 may be embodied as a smart window, and transmittance of sunlight may be freely adjusted.

The air conditioning device 27 is a device for cooling or heating the vehicle interior by heating or cooling while introducing outside air into the vehicle interior or circulating air inside the vehicle. The air conditioning device 27 may be equipped with an evaporator performing a cooling operation and a heater core performing a heating operation inside an air conditioning case and configured to selectively send air cooled or heated by the evaporator or the heater core to each part of the vehicle interior.

In addition, the vehicle 1 may further include a device for giving a vehicle passenger at least one of a visual stimulus, an auditory stimulus, an electric stimulus, a mechanical stimulus, and a physical stimulus including a thermal stimulus, when necessary, under a control command of the controller 150.

In addition, the vehicle 1 according to the embodiment may include a configuration for implementing an autonomous driving function. For example, the vehicle 1 may be equipped with a front camera, a rear camera, and an ultrasonic sensor for detecting the front, rear and periphery, analyze situations of a traveling road such as a shape and width of the road, the number of lanes, curvature, uphill and downhill angles, and the like and the traffic congestion by using high accuracy map information, and perform autonomous traveling of the vehicle by performing engine control, braking control, and steering control.

The vehicle control device according to the embodiment may be embodied in an autonomous vehicle to operate during autonomous driving, but may also be applied to a stop situation or a situation in which passengers other than a driver cat and drink in a non-autonomous vehicle.

Figure 2:
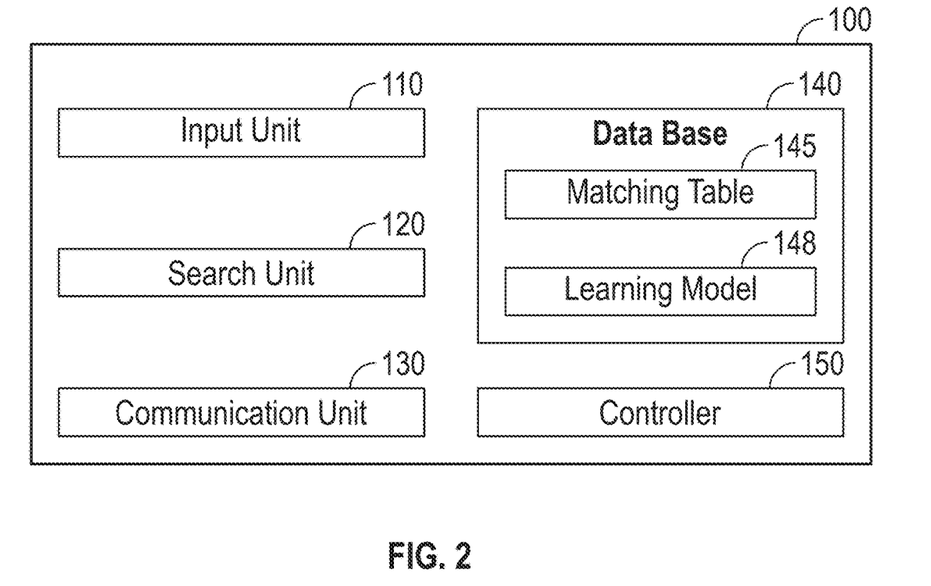
FIG. 2 is a conceptual view of the vehicle control device according to the embodiment.

FIG. 2 is a conceptual view of the vehicle control device according to the embodiment.

The vehicle control device 100 according to the embodiment may include an input unit 110, a search unit 120, a communication unit 130, a database 140, and a controller 150.

In the embodiment, the vehicle control device 100 may be fabricated as a separate module form and included and configured in an ECU constituting the vehicle 1, or implemented as an independent product with a separate device form.

Although the embodiment describes, by way of example, an independent product in a separate device form, it will be understood on the other hand that integrated implementations with configurations embodied in the vehicle 1 are also included in the technical idea and scope of the present disclosure.

In the following embodiments, a server or a terminal may mean a personal computer (PC), a tablet PC, a hand-held terminal, or the like, and include a communication device, a display device, an input device, a payment device, and the like.

For example, the communication devices may perform data communication with each other using telecommunication technologies such as wireless LAN (WLAN), Wi-Fi, wireless broadband (Wibro), World Interoperability for Microwave Access (Wimax), High Speed Downlink Packet Access (HSDPA), IEEE802.16, Long Term Evolution (LTE), wireless mobile broadband service (WMBS), and the like.

In addition, the communication devices may include Bluetooth, radio frequency identification (RFID), infrared data association (IrDA), ultra wideband (UWB), ZigBee, near-field communication (NFC), and the like. In addition, for wired communication technologies, short-range communication schemes such as USB communication, Ethernet, serial communication, optical/coaxial cables, and the like may be further supported.

The input unit 110 may receive food and beverage order information, and/or other provision order information from a terminal of a vehicle passenger or a vehicle user interface. The input unit 110 may receive the food and beverage order etc. information from the terminal of the vehicle passenger by interworking with the terminal of the vehicle passenger or receive the food and beverage order etc. information from an input device provided through the vehicle user interface. Herein, the input device of the vehicle user interface may be integrally formed with the input unit 110.

The input device integrally formed with the input unit 110 may be configured to include a display device and an input device.

For example, the display device may include at least one of a liquid crystal display (LCD), a thin film transistor-liquid crystal display (TFT LCD), an organic light-emitting diode (OLED), a flexible display, a 3D display, and an e-ink display.

In addition, the display device may output various user interfaces or graphic user interfaces on the screen.

The input device may generate input data for operation control of the terminal. The input device may be composed of a keypad, a dome switch, a touch pad, a jog wheel, a jog switch, and the like. When the display device and the touch pad form a mutual layer structure and are configured as a touch screen, the display device may be used not only as an output device but also as an input device.

The input device may receive various commands for operation of the input unit 110.

Alternatively, the input unit 110 may be embodied as AVN. Since the AVN typically has a touch panel as a screen, a button, a keypad, and the like are activated to enable an input of the driver on the screen so that the driver may input food and beverage order information, passenger information, various commands, and the like.

In the embodiment, the food and beverage order information may include a type of ordered food, quantity information, and the like.

In addition, the input unit 110 may receive passenger privacy information from the terminal of the vehicle passenger or the vehicle user interface. In the embodiment, the passenger privacy information may include driver's or passenger's gender, age, job, musical taste, character information, and the like.

In addition, the input unit 110 may receive ambient environment information and driving information through the communication unit 130. In the embodiment, the ambient environment information may include weather, visual information, and the like, and the driving information may include information on travel regions, travel velocities, and the like.

The communication unit 130 may perform data communication with an external server, a portable terminal, and the like. The communication unit 130 may exchange signals with a server or a terminal located outside the vehicle 1. In order to perform communication, the communication unit 130 may include at least one of a transmission antenna, a reception antenna, a radio frequency circuit capable of implementing various communication protocols, and an RF element.

For example, the communication unit 130 may exchange signals with an external device based on the cellular V2X (C-V2X) technology. For example, the C-V2X technology may include LTE-based sidelink communication and/or NR-based sidelink communication.

For example, the communication unit 130 may exchange signals with an external device based on the dedicated short range communications (DSRC) technology or the wireless access in vehicular environment (WAVE) standard based on the IEEE 802.11p physical (PHY)/media access control (MAC) layer technology and the IEEE 1609 network/transport layer technology. The DSRC (or WAVE standard) technology is a communication specification for providing an intelligent transport system (ITS) service through short-range dedicated communication between devices mounted on the vehicle 1 or between a roadside device and a device mounted on the vehicle 1. The DSRC technology may be a communication scheme that may use a frequency band of 5.9 GHZ and have a data transmission rate in the range of 3 Mbps to 27 Mbps. The IEEE 802.11p technology may be combined with the IEEE 1609 technology to support the DSRC technology (or the WAVE standard).

The communication unit 130 may transmit the food and beverage order information, which is received from the input unit 110, to a store server 30 and receive food and beverage delivery information from the store server 30 in real time. Herein, the food and beverage delivery information received by the communication unit 130 may be visually processed and displayed through the display device of the input unit 110. The food and beverage delivery information may be processed and provided in letters, numbers, symbols, emoticons, tables, graphs, and the like.

In addition, the communication unit 130 may collect driving information by performing communication with various components in the vehicle 1 and collect weather information, visual information, and the like from an external server.

In addition, the communication unit 130 may transmit various control commands, which are generated through the controller 150, to a corresponding component.

In addition, the communication unit 130 may receive a matching table from the management server 20 or the store server 30, or update the matching table by performing data communication.

In addition, for example, the communication unit 130 may perform a payment process for a food and beverage order through technology such as fintech, card payment, and the like, but is not limited thereto, and various payment processes may be applied.

The database 140 may include at least one storage medium of a flash memory type, a hard disk type, a multimedia card micro type, a card-type memory (for example, an SD or XD memory or the like), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). In addition, the vehicle control device 100 may manage a web storage performing a storage function of the database 140 on the Internet or operate in associated with the web storage.

The database 140 may store data for a predetermined past period. In addition, the database 140 may store data and a program necessary for the vehicle control device 100 to operate. In addition, the database 140 may store various user interfaces (UIs) or graphic user interfaces (GUIs).

The search unit 120 may search for the vehicle control command using a matching table 145 stored in the database 140.

In the matching table 145, at least one vehicle control command of a vehicle speaker control command, a vehicle display control command, a vehicle interior lighting control command, a vehicle table control command, a vehicle seat control command, a vehicle air conditioning device control command, and a vehicle window control command may be matched with the food and beverage order information as input information.

For example, the matching table 145 may be stored in the database 140, wherein the vehicle speaker control command, the vehicle display control command, the vehicle interior lighting control command, the vehicle table control command, the vehicle air-conditioner control command, the vehicle window control command, and the like are be matched according to the type of food included in the food and beverage order information, or other provision information. That is, control commands for controlling vehicle components such as a vehicle speaker, a vehicle display, a vehicle interior lighting, a vehicle table, a vehicle air conditioning device, a vehicle window, or the like may be matched in response to the type of ordered food.

Alternatively, the matching table 145 may be stored in the database 140, wherein the vehicle speaker control command, the vehicle display control command, the vehicle interior lighting control command, the vehicle table control command, the vehicle seat control command, the vehicle air-conditioner control command, the vehicle window control command, and the like are matched according to information on the type and quantity food included in the food and beverage order information. That is, the control commands for controlling vehicle components such as the vehicle speaker, the vehicle display, the vehicle interior lighting, the vehicle table, the vehicle seat, the vehicle air conditioning device, the vehicle window, or the like may be matched in response to the type and quantity of ordered food, etc.

In addition, in the matching table 145, the vehicle control command may be matched with at least one of passenger privacy information, ambient environment information, and driving information as additional input information.

For example, the matching table 145 may be stored in the database 140, wherein the vehicle speaker control command, the vehicle display control command, the vehicle interior lighting control command, the vehicle table control command, the vehicle seat control command, the vehicle air-conditioner control command, the vehicle window control command, and the like are matched according to the food and beverage order information and the passenger privacy information. That is, the control commands for controlling vehicle components such as the vehicle speaker, the vehicle display, the vehicle interior lighting, the vehicle table, the vehicle seat, the vehicle air conditioning device, the vehicle window, or the like may be matched in response to information on the type and quantity of ordered food and a passenger's gender, age, job, musical taste, character and the like.

For example, the matching table 145 may be stored in the database 140, wherein the vehicle speaker control command, the vehicle display control command, the vehicle interior lighting control command, the vehicle table control command, the vehicle seat control command, the vehicle air-conditioner control command, the vehicle window control command, and the like are matched according to the food and beverage etc. order information and the ambient environment information. That is, the control commands for controlling vehicle components such as the vehicle speaker, the vehicle display, the vehicle interior lighting, the vehicle table, the vehicle seat, the vehicle air conditioning device, the vehicle window, or the like may be matched in response to the type and quantity of ordered food, weather and visual information, and the like.

Alternatively, the matching table 145 may be stored in the database 140, wherein the vehicle speaker control command, the vehicle display control command, the vehicle interior lighting control command, the vehicle table control command, the vehicle seat control command, the vehicle air-conditioner control command, the vehicle window control command, and the like are matched according to the food and beverage etc. order information and the driving information. That is, the control commands for controlling vehicle components such as the vehicle speaker, the vehicle display, the vehicle interior lighting, the vehicle table, the vehicle seat, the vehicle air conditioning device, the vehicle window, or the like may be matched in response to information on the type and quantity of ordered food, etc., a travel region, a travel velocity, and the like.

Alternatively, the matching table 145 may be stored in the database 140, wherein the vehicle speaker control command, the vehicle display control command, the vehicle interior lighting control command, the vehicle table control command, the vehicle seat control command, the vehicle air-conditioner control command, the vehicle window control command, and the like are matched according to the food and beverage order information, the passenger privacy information, the ambient environment information, and the driving information. That is, the control commands for controlling vehicle components such as the vehicle speaker, the vehicle display, the vehicle interior lighting, the vehicle table, the vehicle seat, the vehicle air conditioning device, the vehicle window, or the like may be matched in response to the type and quantity of ordered food, etc., a passenger's gender, age, job, musical taste and character, weather and visual information, a travel region, a travel velocity, and the like.

Alternatively, the search unit 120 may search for the vehicle control command using a learning model 148 stored in the database 140.

In addition, in the matching table, the vehicle control command may be matched with at least one of passenger privacy information, ambient environment information, and driving information as additional input information.

For example, the matching table may be stored in the database 140, wherein the vehicle speaker control command, the vehicle display control command, the vehicle interior lighting control command, the vehicle table control command, the vehicle seat control command, the vehicle air-conditioner control command, the vehicle window control command, and the like are matched according to the food and beverage order information and the passenger privacy information. That is, the control commands for controlling vehicle components such as the vehicle speaker, the vehicle display, the vehicle interior lighting, the vehicle table, the vehicle seat, the vehicle air conditioning device, the vehicle window, or the like may be matched in response to information on the type and quantity of ordered food and a passenger's gender, age, job, musical taste, character and the like.

For example, the matching table may be stored in the database 140, wherein the vehicle speaker control command, the vehicle display control command, the vehicle interior lighting control command, the vehicle table control command, the vehicle seat control command, the vehicle air-conditioner control command, the vehicle window control command, and the like are matched according to the food and beverage etc. order information and the ambient environment information. That is, the control commands for controlling vehicle components such as the vehicle speaker, the vehicle display, the vehicle interior lighting, the vehicle table, the vehicle seat, the vehicle air conditioning device, the vehicle window, or the like may be matched in response to the type and quantity of ordered food, weather and visual information, and the like Alternatively, the matching table may be stored in the database 140, wherein the vehicle speaker control command, the vehicle display control command, the vehicle interior lighting control command, the vehicle table control command, the vehicle seat control command, the vehicle air-conditioner control command, the vehicle window control command, and the like are matched according to the food and beverage etc. order information and the driving information. That is, the control commands for controlling vehicle components such as the vehicle speaker, the vehicle display, the vehicle interior lighting, the vehicle table, the vehicle seat, the vehicle air conditioning device, the vehicle window, or the like may be matched in response to information on the type and quantity of ordered food, etc., a travel region, a travel velocity, and the like.

Alternatively, the matching table may be stored in the database 140, wherein the vehicle speaker control command, the vehicle display control command, the vehicle interior lighting control command, the vehicle table control command, the vehicle seat control command, the vehicle air-conditioner control command, the vehicle window control command, and the like are matched according to the food and beverage order information, the passenger privacy information, the ambient environment information, and the driving information. That is, the control commands for controlling vehicle components such as the vehicle speaker, the vehicle display, the vehicle interior lighting, the vehicle table, the vehicle seat, the vehicle air conditioning device, the vehicle window, or the like may be matched in response to the type and quantity of ordered food, etc., a passenger's gender, age, job, musical taste and character, weather and visual information, a travel region, a travel velocity, and the like.

Alternatively, the search unit 120 may search for the vehicle control command using a learning model stored in the database 140.

The learning model may be trained with the food and beverage order information as input information to output at least one vehicle control command of the vehicle speaker control command, the vehicle display control command, the vehicle interior lighting control command, the vehicle table control command, the vehicle seat control command, the vehicle air conditioning device control command, and the vehicle window control command.

The learning model may learn a correlation between the food and beverage order information and the vehicle control command, and output the vehicle control command when the food and beverage order information is input.

The learning model may include a deep learning model which has the food and beverage order information, etc., as an input layer, learns a correlation with the vehicle control command including at least one of the vehicle speaker control command, the vehicle display control command, the vehicle interior lighting control command, the vehicle table control command, the vehicle seat control command, the vehicle air conditioning device control command, and the vehicle window control command, and is trained to have the vehicle control command for the input food and beverage order etc. information as an output layer.

The learning model may include a computer-readable program. The program may be stored in a recording medium or storage device executable by a computer. A processor in the computer may read out the program stored in the recording medium or the storage device, calculate input information by executing the program, that is, the trained model, and output a calculation result.

For example, the learning model may include a deep learning model trained for each type of food and beverage, etc.

In addition, the learning model may be trained with at least one of the passenger privacy information, the ambient environment information, and the driving information as additional input information.

That is, the learning model may include the deep learning model which has additional input information including at least one of the food and beverage order information, the passenger privacy information, the ambient environment information, and the driving information as an input layer, learns a correlation with the vehicle control command including at least one of the vehicle speaker control command, the vehicle display control command, the vehicle interior lighting control command, the vehicle table control command, the vehicle seat control command, the vehicle air conditioning device control command, and the vehicle window control command, and is trained to have the vehicle control command for the input food and beverage order information and the additional input information as an output layer.

Alternatively, the search unit 120 may access the server 30 of a company providing ordered food and beverage, etc., and search for the vehicle control command. The search unit 120 may request a vehicle control command or request a matching table 145 to a server of a company, to which food and beverage etc. are ordered, through the communication unit 130.

The controller 150 may output the vehicle control command for a predetermined time based on a food and beverage reception time according to the food and beverage etc. order information and control an output of a corresponding vehicle component.

In the embodiment, the vehicle speaker control command may mean a control command for an auditory material that is output through the vehicle speaker. The vehicle display control command may mean a control command for visual materials that are output through various display devices disposed inside the vehicle. The vehicle interior lighting control command may mean control commands for the on/off, illuminance, brilliance, luminous intensity, brightness, and the like of the vehicle interior lighting. The vehicle table control command may include folding, unfolding, height adjustment, tilting, swiveling commands, and the like for a table disposed inside the vehicle. The vehicle air conditioning device control command may include on/off, strength control, and temperature control commands and the like for an air conditioning device. The vehicle window control command may include an opening and closing control command for each window disposed in the vehicle and a command for controlling sunlight transmittance.

The food and beverage etc. reception time may be provided from the server of the company providing the ordered food and beverage to at least one of the terminal of the vehicle passenger and the vehicle user interface.

In the embodiment, the controller 150 may include at least one electronic control device (for example, an electronic control unit (ECU)) of the vehicle and control an overall operation of at least one electronic device provided in the vehicle.

In addition, the controller 150 may electrically control various driving devices of the vehicle 1 inside the vehicle 1. The controller 150 may include a powertrain driving control device, a chassis driving control device, a door/window driving control device, a safety device driving control device, a lamp driving control device, an AVN driving control device, a HUD driving control device, and an air conditioning driving control device. The powertrain driving control device may include a power source driving control device and a transmission driving control device. The chassis driving control device may include, a steering driving control device, a brake driving control device, and a suspension driving control device. Meanwhile, the safety device driving control device may include a seat belt driving control device for seat belt control.

In addition, the controller 150 may control a vehicle driving device based on a signal received from an electronic device for autonomous driving. For example, the controller 150 may control a powertrain, a steering device, and a brake device based on signals received from the electronic device for autonomous driving.

Figure 3:
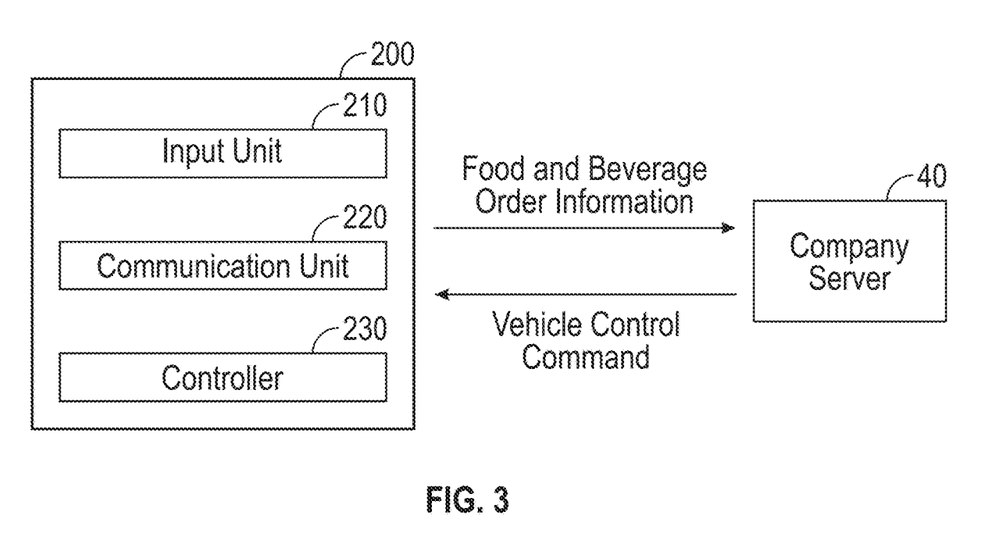
FIG. 3 is a conceptual view of a vehicle service provision system according to the embodiment.

FIG. 3 is a conceptual view of a vehicle service provision system according to the embodiment.

Referring to FIG. 3, a vehicle control device 200 may include an input unit 210 configured to receive food and beverage order etc. information from a terminal of a vehicle passenger or a vehicle user interface, a communication unit 220 configured to transmit the food and beverage order etc. information, and a controller 230 configured to output a vehicle control command for a predetermined time based on a food and beverage etc. reception time according to the food and beverage order information and control an output of a corresponding vehicle component.

In addition, the communication unit 220 may transmit at least one of passenger privacy information, ambient environment information, and driving information as additional input information to a company server 40.

The company server 40 may receive the food and beverage order etc. information and transmit a corresponding vehicle control command to the communication unit 220 of the vehicle control device 200. The company server 40 may generate a vehicle control command including at least one of a vehicle speaker control command, a vehicle display control command, a vehicle interior lighting control command, a vehicle seat control command, a vehicle table control command, a vehicle air conditioning device control command, and a vehicle window control command matched with input information with the food and beverage order information as the input information, and transmit the vehicle control command to the communication unit 220.

When receiving the food and beverage order etc. information, the company server 40 may generate a vehicle control command corresponding thereto by itself or search for the vehicle control command according to a prestored matching table, and transmit the vehicle control command to the vehicle control device 200.

In addition, the company server 40 may generate a vehicle control command matched with the food and beverage order etc. information and the additional input information and transmit the vehicle control command to the communication unit 220. Herein, the additional input information may include at least one of the passenger privacy information, the ambient environment information, and the driving information.

In addition, the company server 40 may generate a vehicle control command to correspond to at least one of visual information and auditory information provided in a store and transmit the vehicle control command to the communication unit 220 of the vehicle control device 200. The company server 40 may generate the vehicle control command according to lighting information, display information, and music information provided in the store and transmit the vehicle control command to the vehicle control device 200. That is, the same ambiance as the store may be created by generating and providing contents provided in the store, to which food and beverage etc. are ordered, as vehicle control commands.

Figure 4A:
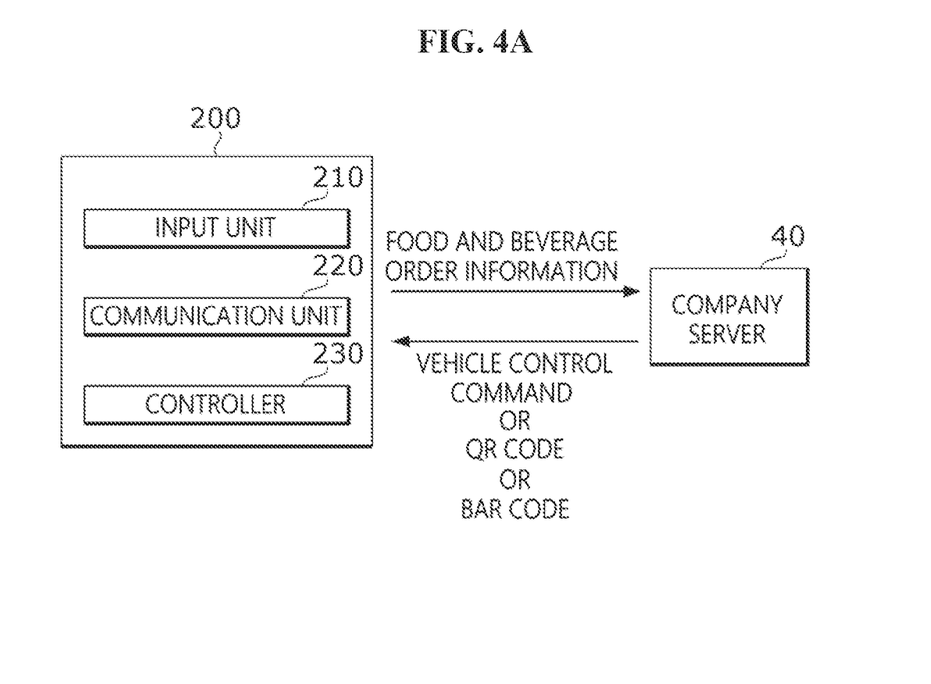
FIGS. 4A and 4B are conceptual views of a vehicle service provision system according to another embodiment.
Figure 4B:
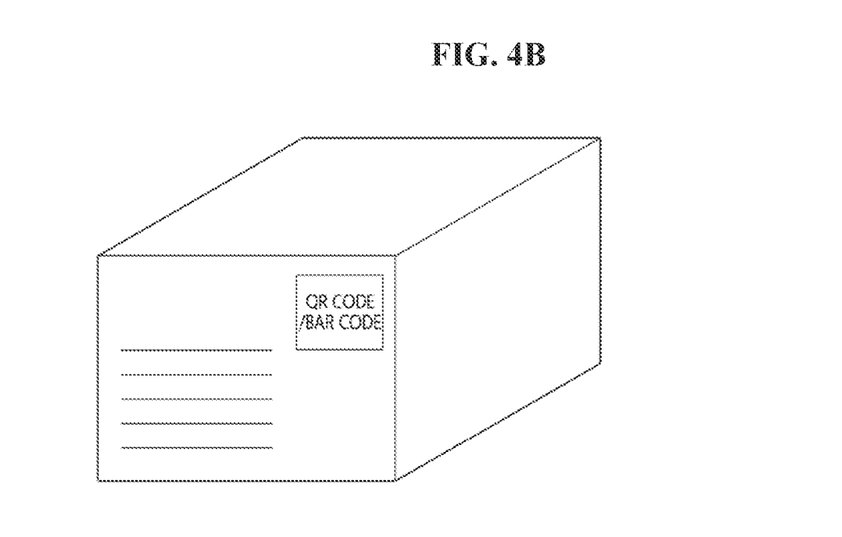

FIGS. 4A and 4B are conceptual views of a vehicle service provision system according to another embodiment.

Referring to FIGS. 4A and 4B, a store receiving an order of food and beverage etc. may provide a vehicle control command or a matching table in a form of a bar code or a QR code. The bar code or the QR code including the vehicle control command, or the matching table may be remotely transmitted through the communication unit 220 of the vehicle control device 200 as shown in FIG. 4A, or provided as a form of imprint or sticker on a take-out container of delivered food and beverage etc., as shown in FIG. 4B.

When a vehicle passenger scans the bar code or the QR code using a terminal interworking with the vehicle control device 200, the vehicle control command or the matching table included in the bar code or the QR code may be read out and delivered to the controller 230. The controller 230 may output the vehicle control command to a corresponding vehicle component and control an operation.

Figure 5:
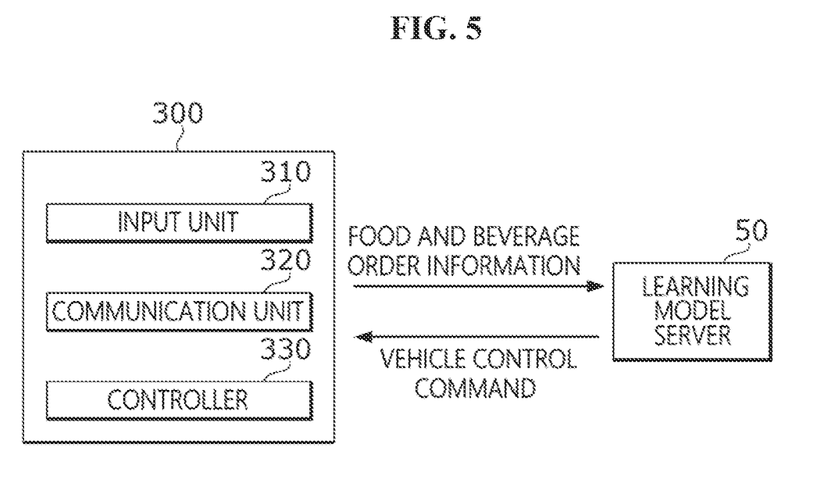
FIG. 5 is a conceptual view of a vehicle service provision system according to still another embodiment.

FIG. 5 is a conceptual view of a vehicle service provision system according to still another embodiment.

Referring to FIG. 5, a vehicle control device 300 may include an input unit 310 configured to receive food and beverage etc. order information from a terminal of a vehicle passenger or a vehicle user interface, a communication unit 320 configured to transmit the food and beverage order etc. information, and a controller 330 configured to output a vehicle control command for a predetermined time based on a food and beverage etc. reception time according to the food and beverage order etc. information and control an output of a corresponding vehicle component.

A learning model server 50 may include a learning model trained to output a vehicle control command using food and beverage etc. order information as input information, and when the food and beverage order etc. information is input, generate the vehicle control command by the learning model and transmit the vehicle control command to the communication unit 320 of the vehicle control device 300.

The learning model of the learning model server 50 may be trained to output the vehicle control command including at least one of a vehicle speaker control command, a vehicle display control command, a vehicle interior lighting control command, a vehicle table control command, a vehicle seat control command, a vehicle air conditioning device control command, and a vehicle window control command with the food and beverage order information as input information.

In addition, the learning model of the learning model server 50 may be trained with at least one of passenger privacy information, ambient environment information, and driving information as additional input information.

The vehicle control device 300 may transmit data for training to the remote learning model server 50 and control a vehicle by applying a parameter received from the learning model server 50 to an algorithm of the vehicle control device 300.

According to the embodiment, the learning model server 50 may receive data for training from a plurality of the vehicle control devices 300 and extract a parameter by re-training with the data for training. The learning model server 50 may train with the data for training using, for example, a deep learning technique, but is not limited thereto, and train with the data for training using various techniques and extract a parameter.

In the embodiment, the vehicle control device 300 may be used interchangeably with a local machine, and the learning model server 50 may collect data for training from the plurality of vehicle control devices 300.

In addition, the vehicle control device 300 according to the embodiment may select data for training by preprocessing input data and transmit only the selected data for training to the learning model server 50. Accordingly, communication traffic between the vehicle control device 300 and the learning model server 50 may be reduced, and the computational quantity of the learning model server 50 may be reduced.

Figure 6:
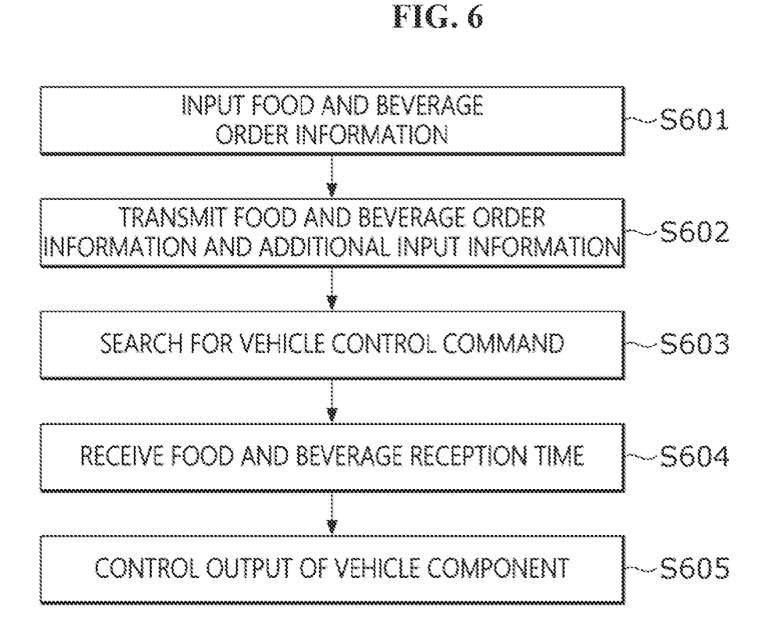
FIG. 6 is a flowchart of a vehicle service provision method according to the embodiment.

FIG. 6 is a flowchart of a vehicle service provision method according to the embodiment.

First, an input unit may receive food and beverage etc. order information from a terminal of a vehicle passenger or a vehicle user interface. Herein, the input unit may receive at least one of passenger privacy information, ambient environment information, and driving information as additional input information (S601).

Next, a communication unit may transmit the food and beverage etc. order information and the additional input information to a company server (S602).

Next, a search unit may search for at least one vehicle control command matched with the food and beverage etc. order information and the additional input information (S603).

The search unit may search for the vehicle control command using a matching table stored in a database (S604).

Alternatively, the search unit may search for the vehicle control command using a learning model stored in the database (S605).

Alternatively, the search unit may access a server of a company providing ordered food and beverage etc. and search for the vehicle control command (S606).

Next, the communication unit may receive a food and beverage reception time from the server of the company providing the ordered food and beverage etc. (S607).

Next, a controller may output the vehicle control command for a predetermined time based on the food and beverage etc. reception time according to the food and beverage order information and control an output of a corresponding vehicle component (S608).

Figure 7:
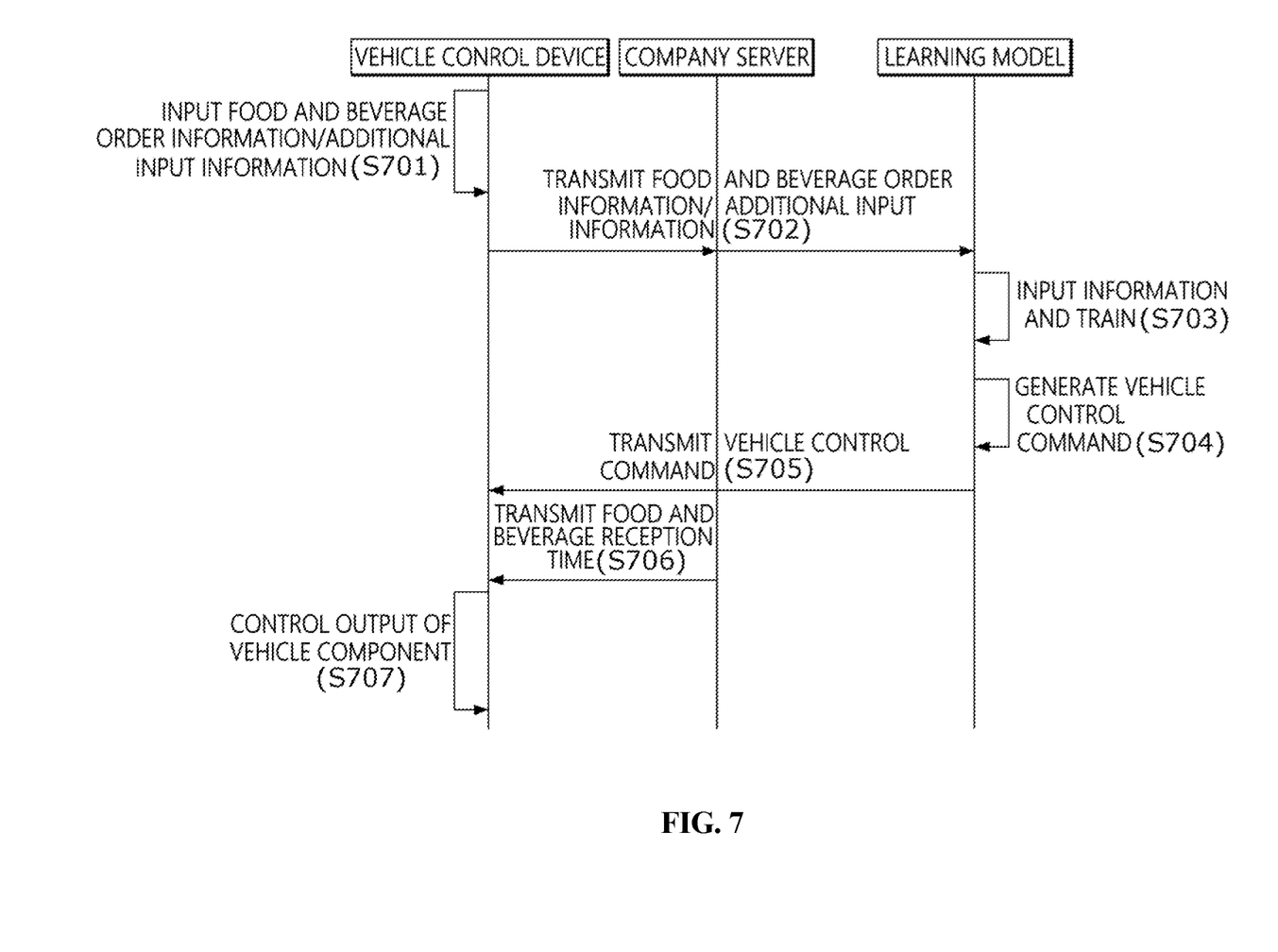
FIG. 7 is a flowchart of a vehicle service provision method according to another embodiment.

FIG. 7 is a flowchart of a vehicle service provision method according to another embodiment.

First, an input unit may receive food and beverage etc. order information from a terminal of a vehicle passenger or a vehicle user interface. Herein, the input unit may receive at least one of passenger privacy information, ambient environment information, and driving information as additional input information (S701).

Next, a communication unit may transmit the food and beverage etc. order information and the additional input information to a company server and a learning model server (S702).

Next, the learning model server may input the food and beverage etc. order information and the additional input information into a learning model that is trained to output a vehicle control command through the food and beverage etc. order information and the additional input information (S703).

Next, the learning model server may generate the vehicle control command using the learning model (S704).

Next, the learning model server may transmit the generated vehicle control command to the communication unit of a vehicle control device (S705).

Next, the communication unit may receive a food and beverage etc. reception time from the server of the company providing the ordered food and beverage etc. (S706).

Next, a controller may output the vehicle control command for a predetermined time based on the food and beverage etc. reception time according to the food and beverage order information and control an output of a corresponding vehicle component (S707).

Figure 8:
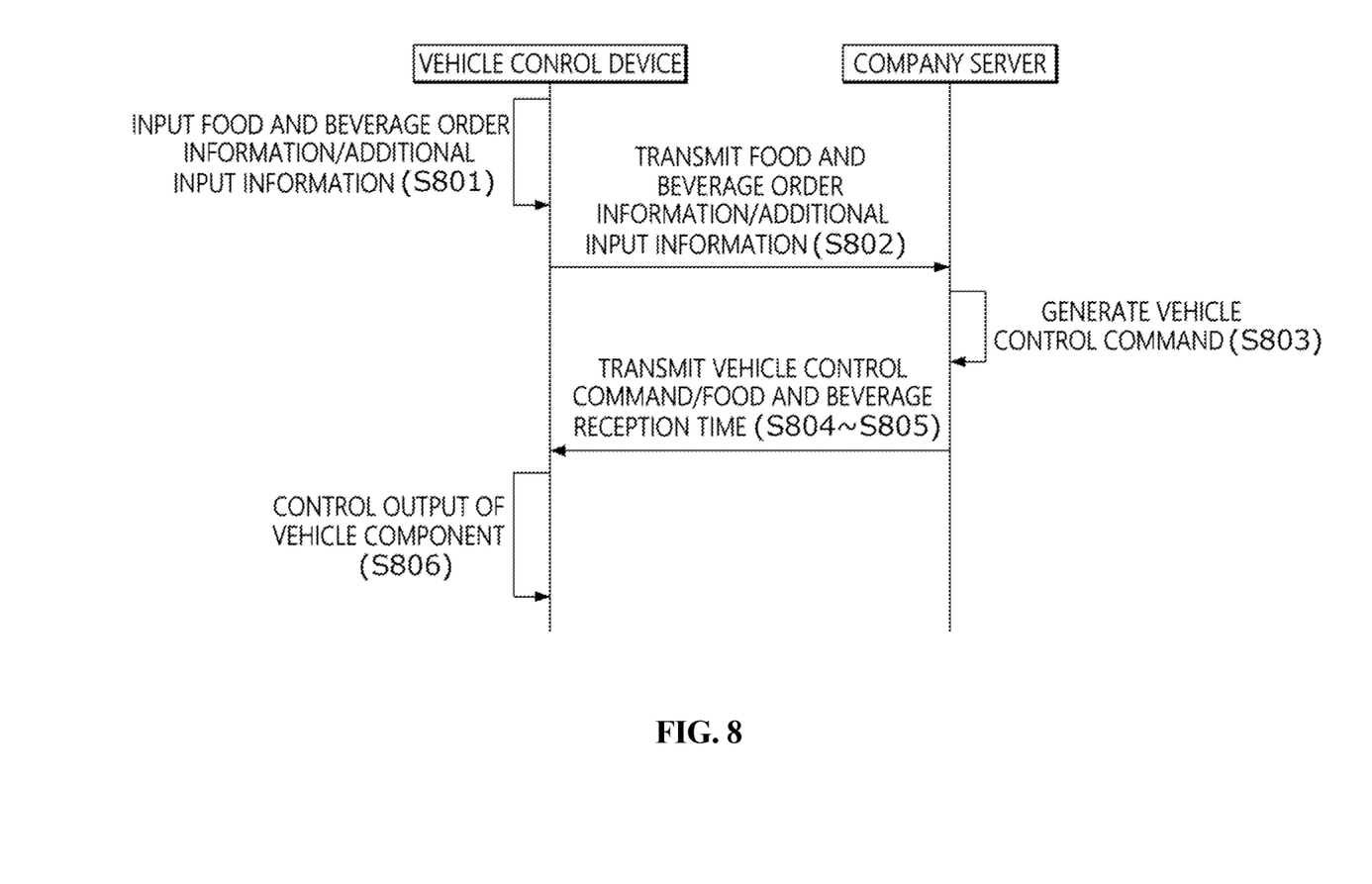
FIG. 8 is a flowchart of a vehicle service provision method according to still another embodiment.

FIG. 8 is a flowchart of a vehicle service provision method according to still another embodiment.

First, an input unit may receive food and beverage etc. order information from a terminal of a vehicle passenger or a vehicle user interface. Herein, the input unit may receive at least one of passenger privacy information, ambient environment information, and driving information as additional input information (S801).

Next, a communication unit may transmit the food and beverage etc. order information and the additional input information to a company server (S802).

Next, the company server may receive the food and beverage order information and generate a corresponding vehicle control command. For example, the company server may generate the vehicle control command to correspond to at least one of visual information and auditory information provided in a store. Herein, the company server may generate the vehicle control command by matching the food and beverage etc. order information and the additional input information (S803).

Next, the company server may transmit the generated vehicle control command to the communication unit of a vehicle control device (S804).

Next, the communication unit may receive a food and beverage etc. reception time from the server of the company providing the ordered food and beverage etc. (S805).

Next, a controller may output the vehicle control command for a predetermined time based on the food and beverage etc. reception time according to the food and beverage order information and control an output of a corresponding vehicle component (S806).

A method according to an embodiment may be implemented in forms of program instructions executable by various computer devices and be recorded in a computer-readable medium. Herein, the medium may constantly store computer-executable programs or temporarily store the programs for execution or downloading. In addition, the medium may be various recording devices or storage devices in a form of a single hardware component or a combination of multiple hardware components and be distributed over a network without being limited to a medium directly accessing a computer system. Examples of the medium may include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium may include recording media and storage media managed by application stores distributing applications or by websites, servers, and the like supplying or distributing other various types of software.

A vehicle control device and a vehicle service provision system according to an embodiment can order and receive food and beverage online in a vehicle.

In addition, various components of a vehicle can be controlled according to food and beverage information, passenger information, ambient environment information, or the like.

In addition, an optimal ambient environment for having food and beverage inside a vehicle can be created thus.

Although the present disclosure has been described above with reference to exemplary embodiments, it will be understood that those skilled in the art can make various changes and alterations without departing from the idea and scope of the present disclosure as defined by the appended claims.

What is claimed is:

1. A vehicle control device, comprising:
an input unit configured to receive provision order information, including food and/or beverage order information, from a terminal of a vehicle passenger or a vehicle user interface;
a search unit configured to search, using at least one of a matching table or a learning model stored in a database, for at least one vehicle control command matched with the provision order information; and
a controller configured to output the vehicle control command for a predetermined time based on a provision reception time according to the provision order information and control an output of a corresponding vehicle component including at least one of a vehicle speaker, a vehicle display, a vehicle interior lighting, a vehicle table, a vehicle air conditioning device, and a vehicle window which is matched with the provision order information,
wherein the controller controls the vehicle control command to be output for a predetermined time based on a food and/or beverage receipt time, which is provided by a server of a company providing the ordered food and/or beverage to at least one of the vehicle passenger's terminal or/and the vehicle user interface, the food and/or beverage receipt time being based on the provision order information.

2. The vehicle control device of claim 1, wherein the search unit searches for the vehicle control command using the matching table stored in a database, and, in the matching table, at least one vehicle control command of a vehicle speaker control command, a vehicle display control command, a vehicle interior lighting control command, a vehicle table control command, a vehicle air conditioning device control command, and a vehicle window control command is matched with the food and/or beverage order information as input information.

3. The vehicle control device of claim 2, wherein, in the matching table, the vehicle control command is matched according to at least one of food type information and quantity information included in the food and/or beverage order information.

4. The vehicle control device of claim 2, wherein, in the matching table, the vehicle control command is matched with at least one of passenger privacy information, ambient environment information, and driving information as additional input information.

5. The vehicle control device of claim 1, wherein the search unit searches for the vehicle control command using the learning model stored in the database.

6. The vehicle control device of claim 5, wherein the learning model is trained to output at least one vehicle control command of a vehicle speaker control command, a vehicle display control command, a vehicle interior lighting control command, a vehicle table control command, a vehicle air conditioning device control command, and a vehicle window control command with the food and/or beverage order information as input information.

7. The vehicle control device of claim 6, wherein the learning model is trained with at least one of passenger privacy information, ambient environment information, and driving information as additional input information.

8. The vehicle control device of claim 1, wherein the search unit includes a communication unit configured to access the server of the company providing ordered food and/or beverage and searches for the vehicle control command.

9. The vehicle control device of claim 1, wherein the food and/or beverage reception time is provided from the server of the company providing ordered food and/or beverage to at least one of the terminal of the vehicle passenger and the vehicle user interface.

10. A vehicle control service provision system, comprising:
a vehicle control device including:
an input unit configured to receive provision order information, including food and/or beverage order information, from a terminal of a vehicle passenger or a vehicle user interface;
a communication unit configured to transmit the provision order information; and
a controller configured to output a vehicle control command for a predetermined time based on a provision reception time according to the provision order information and control an output of a corresponding vehicle component including at least one of a vehicle speaker, a vehicle display, a vehicle interior lighting, a vehicle table, a vehicle air conditioning device, and a vehicle window which is matched with the provision order information; and a company server configured to receive the provision order information and transmit the vehicle control command corresponding thereto, using at least one of a matching table or a learning model stored in the company server, to the communication unit of the vehicle control device, wherein the controller controls the vehicle control command to be output for a predetermined time based on a food and/or beverage receipt time, which is provided from the company server of a company providing the ordered food and/or beverage to at least one of the vehicle passenger's terminal and the vehicle user interface, the food and/or beverage receipt time being based on the provision order information.

11. The vehicle control service provision system of claim 10, wherein the company server generates the vehicle control command to correspond to at least one of visual information and auditory information provided to a store and transmits the vehicle control command to the communication unit of the vehicle control device.

12. The vehicle control service provision system of claim 11, wherein the company server generates the vehicle control command including at least one of a vehicle speaker control command, a vehicle display control command, a vehicle interior lighting control command, a vehicle table control command, a vehicle air conditioning device control command, and a vehicle window control command matched with input information with the provision order information as the input information, and transmits the vehicle control command to the communication unit.

13. The vehicle control service provision system of claim 12, wherein the communication unit transmits at least one of passenger privacy information, ambient environment information, and driving information as additional input information to the company server.

14. The vehicle control service provision system of claim 13, wherein the company server generates the vehicle control command matched with the input information and the additional input information and transmits the vehicle control command to the communication unit.

15. The vehicle control service provision system of claim 10, wherein the company server generates the food and/or beverage reception time and provides the food and beverage reception time to at least one of the terminal of the vehicle passenger and the vehicle user interface.

16. A vehicle control service provision system, comprising:

a vehicle control device including an input unit configured to receive provision order information, including food and/or beverage order information, from a terminal of a vehicle passenger or a vehicle user interface, a communication unit configured to transmit the provision order information, and a controller configured to output a vehicle control command for a predetermined time based on a provision reception time according to the provision order information and control an output of a corresponding vehicle component including at least one of a vehicle speaker, a vehicle display, a vehicle interior lighting, a vehicle table, a vehicle air conditioning device, and a vehicle window which is matched with the provision order information; and a learning model server including a learning model trained to output the vehicle control command using the provision order information as input information, and configured to generate the vehicle control command using the learning model, when the provision order information is input, and transmit the vehicle control command to the communication unit of the vehicle control device, wherein the controller controls the vehicle control command to be output for a predetermined time based on a food and/or beverage receipt time, which is provided from a server of a company providing the ordered food and/or beverage to at least one of the vehicle passenger's terminal and the vehicle user interface, the food and/or beverage receipt time being based on the provision order information.

17. The vehicle control service provision system of claim 16, wherein the learning model is trained to output the vehicle control command including at least one of a vehicle speaker control command, a vehicle display control command, a vehicle interior lighting control command, a vehicle table control command, a vehicle air conditioning device control command, and a vehicle window control command with the provision order information as input information.

18. The vehicle control service provision system of claim 17, wherein the learning model is trained with at least one of passenger privacy information, ambient environment information, and driving information as additional input information.

19. The vehicle control service provision system of claim 16, wherein the learning model server constructs the learning model by receiving training data from a plurality of vehicle control devices.

* * * * *